(12) United States Patent
Ponomarev et al.

(10) Patent No.: US 11,701,852 B2
(45) Date of Patent: Jul. 18, 2023

(54) SHOE MANUFACTURING

(71) Applicant: HEWLETT-PACKARD DEVELOPMENT COMPANY, L.P., Spring, TX (US)

(72) Inventors: Edward Ponomarev, San Diego, CA (US); Stephen George Miller, San Diego, CA (US); Matthew G. Lopez, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 52 days.

(21) Appl. No.: 15/733,882

(22) PCT Filed: Jul. 20, 2018

(86) PCT No.: PCT/US2018/043099
§ 371 (c)(1),
(2) Date: Nov. 30, 2020

(87) PCT Pub. No.: WO2020/018115
PCT Pub. Date: Jan. 23, 2020

(65) Prior Publication Data
US 2021/0213697 A1    Jul. 15, 2021

(51) Int. Cl.
*B29D 35/06* (2010.01)
*B33Y 10/00* (2015.01)
*B29C 64/386* (2017.01)

(52) U.S. Cl.
CPC ............ *B29D 35/06* (2013.01); *B29C 64/386* (2017.08); *B33Y 10/00* (2014.12)

(58) Field of Classification Search
CPC ....... B29C 64/386; B33Y 10/00; B29D 35/06; A43D 3/021
See application file for complete search history.

(56) References Cited

U.S. PATENT DOCUMENTS

| 5,896,608 A | 4/1999 | Whatley |
| 6,519,876 B1 | 2/2003 | Geer et al. |

(Continued)

FOREIGN PATENT DOCUMENTS

| EP | 2430938 B1 | 6/2018 |
| RU | 2223020 C2 | 2/2004 |

(Continued)

OTHER PUBLICATIONS

HPDC, "PCT International Search Report," dated Apr. 18, 2019, PCT App. No. PCT/US2018/043099, 11 pp.

*Primary Examiner* — Larry W Thrower
(74) *Attorney, Agent, or Firm* — Michael Dryja

(57) ABSTRACT

Example shoe manufacturing methods and related computer readable medium for implementing a portion of said manufacturing methods are disclosed herein. In some examples, the method includes producing a lower portion of a last based on data relating to a foot of a user. In addition, the method includes placing an upper member about the last such that a lasting of the upper member extends over the lower portion of the last. Further, the method includes producing a midsole element based on the data relating to the foot of the user, and attaching the midsole element to the upper member such that the lasting is disposed between the lower portion of the last and the midsole element.

8 Claims, 9 Drawing Sheets

(56) References Cited

U.S. PATENT DOCUMENTS

| | | | |
|---|---|---|---|
| 7,627,963 | B2 | 12/2009 | Kilgore |
| 7,752,775 | B2 | 7/2010 | Lyden |
| 8,205,356 | B2 | 6/2012 | Ellis |
| 8,595,957 | B2 | 12/2013 | McDowell et al. |
| 9,282,784 | B2 | 3/2016 | Adeagbo et al. |
| 9,801,426 | B2 | 10/2017 | Cooper |
| 9,980,535 | B2 | 5/2018 | Bohnsack et al. |
| 2003/0140525 | A1 | 7/2003 | Branger |
| 2014/0109440 | A1* | 4/2014 | McDowell ............. A43B 13/16 36/103 |
| 2014/0182170 | A1* | 7/2014 | Wawrousek ............. A43B 5/02 702/155 |
| 2016/0125499 | A1 | 5/2016 | Gooch et al. |

FOREIGN PATENT DOCUMENTS

| | | | | |
|---|---|---|---|---|
| SU | 327919 | A1 | 3/1972 | |
| WO | WO-2008070537 | A2 * | 6/2008 | ............. A43D 1/025 |
| WO | WO-2018097337 | A1 | 5/2018 | |

\* cited by examiner

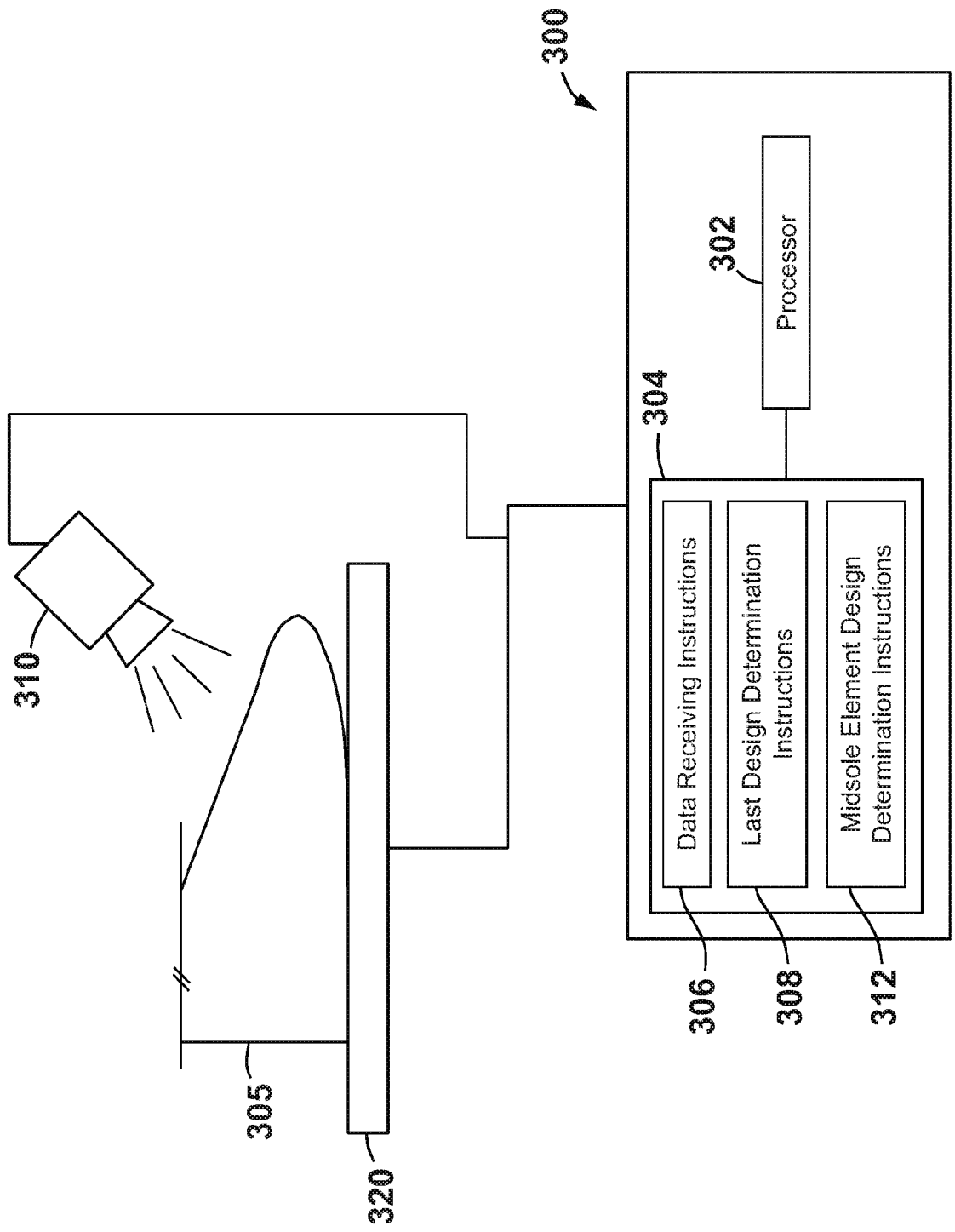

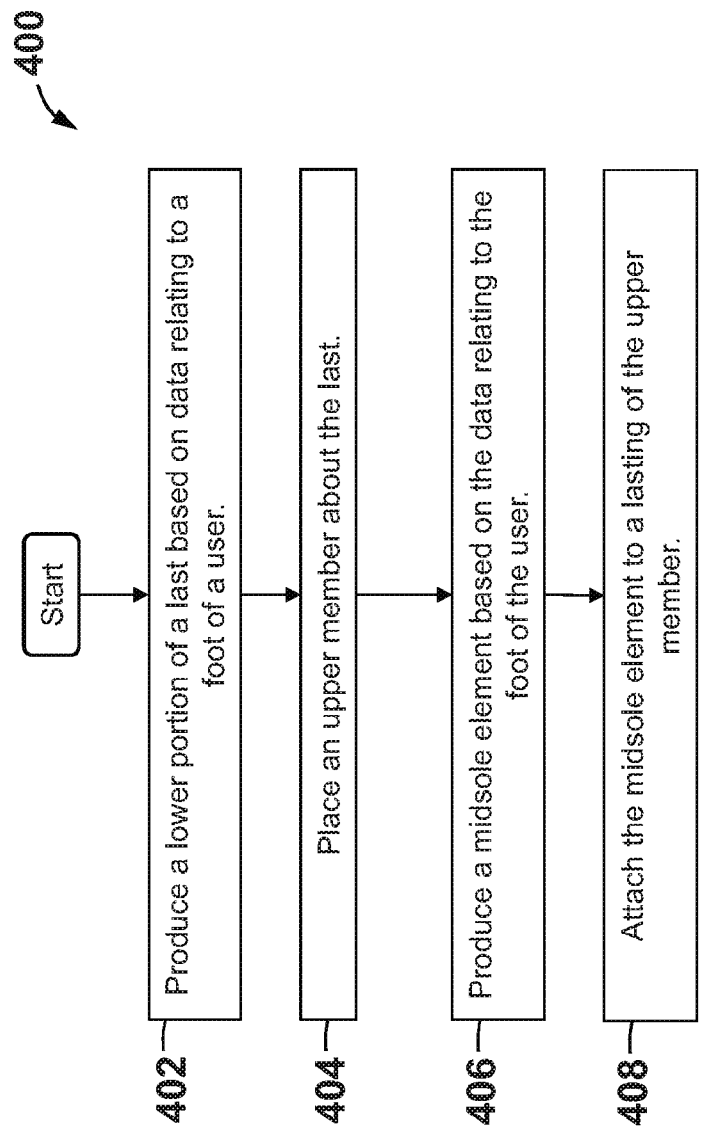

US 11,701,852 B2

SHOE MANUFACTURING

BACKGROUND

Footwear of various types, including some boots, sandals, and athletic shoes, may be formed by a fabrication method that includes assembling various pre-manufactured components into a mold and injecting an elastomer, or another moldable material, into the mold to produce a portion of the sole. The moldable material bonds the other components together and provides additional structure to the sole. The end result is a completed piece of footwear.

BRIEF DESCRIPTION OF THE DRAWINGS

Various examples will be described below referring to the following figures:

FIG. 8 is a schematic view of a computer system for facilitating the manufacturing of a shoe according to some examples; and FIG. 9 is a flow chart of a method of manufacturing a shoe according to some examples.

DETAILED DESCRIPTION

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections.

As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 20% of the stated value or condition.

As used herein, "moldable" refers broadly to a capability of a material to flow into or to be injected into a mold or to be plastically deformed (which is a type of molding process in some examples) into a desired shape. Moldable further refers to such capability, as described above, for the material before, during, or after molding or deformation occurs. As examples, a suitable material supplied for a molding process is moldable, and the final product, such as a portion of the sole of a shoe, is moldable even after cooling or curing is completed. The term "moldable material" may refer to such a material at any stage of a process or any stage of the life of a product. As used herein, the term "user" refers to a person that is to wear a piece of footwear (e.g., a shoe). In addition, as used herein, the term "midsole element" may refer to either a portion or an entire midsole of a piece of footwear (e.g., a shoe).

As previously described, footwear may be manufactured by molding a sole (or portion thereof, such as, a midsole or outsole portion) to other pre-manufactured or preassembled components. By utilizing this sort of manufacturing method, it can be difficult to incorporate individualized or customized components to provide performance characteristics that are tailored to a specific individual's foot (e.g., flexure, hardness, rebound, lateral and medial support characteristics, comfort, etc.). In many cases, providing a shoe that delivers such individualized performance characteristics is particularly desirable, such as for athletes or individuals requiring specialized support due to, for example, an injury or disorder. Accordingly, examples disclosed herein include manufacturing methods for producing footwear that incorporate such individualized components and features and machine readable instructions for carrying out portions of these manufacturing processes.

Figure 1:
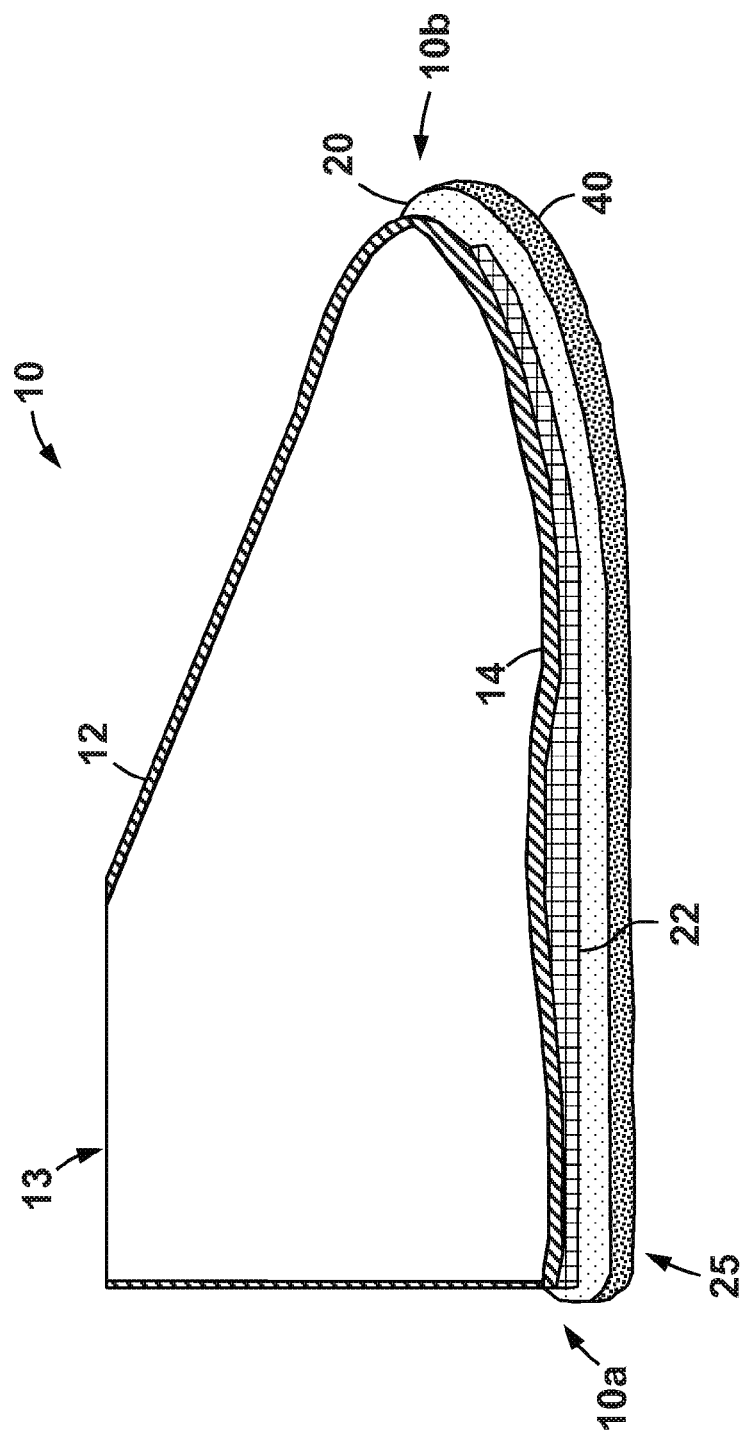
FIG. 1 is a schematic cross-sectional view of a shoe made according to some examples.

Referring now to FIG. 1, footwear 10 that is manufactured according to examples disclosed herein is shown. In this example, and in the other examples expressly described herein, footwear 10 comprises a shoe, and thus, footwear 10 may be generally referred to herein as a shoe 10. However, it should be appreciated that footwear 10 may also comprise a boot, sandal, or any other suitable form of footwear.

Shoe 10 includes a first or heel end 10a, a second or toe end 10b opposite heel end 10a, and an upper opening 13 to provide access for a user's foot (not shown) into shoe 10. When the foot of a user (not shown) is received through opening 13 and into shoe 10, the heel of the user's foot is proximate heel end 10a, and the toes of the user's foot are proximate toe end 10b. In addition, shoe 10 includes an upper member 12 that further includes a lasting 14, a midsole 20 attached to upper member 12 that further includes a customized midsole element 22. Further, shoe 10 includes an outsole 40 mounted to the midsole 20. Together, the midsole 20 and outsole 40 may be referred to as the sole 25 of shoe 10.

As will be described in more detail below, in some examples midsole element 22 and lasting 14 are customized portions of the shoe 10 that are designed, formed, or installed based on data relating to the foot of a specific user so as to provide a desired profile and/or performance characteristics specific to the user's foot (e.g., flexure, hardness, rebound, lateral and medial support characteristics, comfort, etc.). A method for manufacturing shoe 10 will now be described in more detail below.

Figure 2:
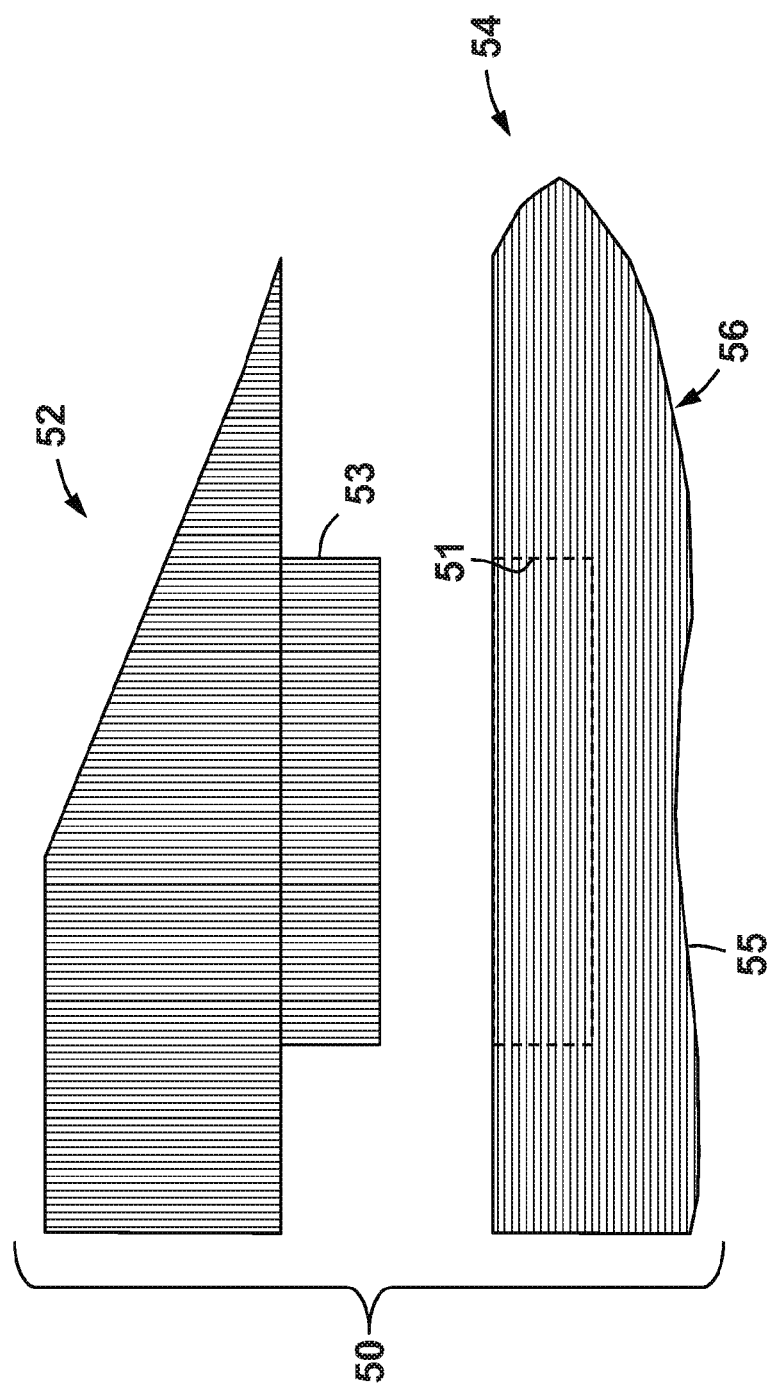
FIG. 2 is a schematic, cross-sectional view of last for use in manufacturing the shoe of FIG. 1 according to some examples.
Figure 3:
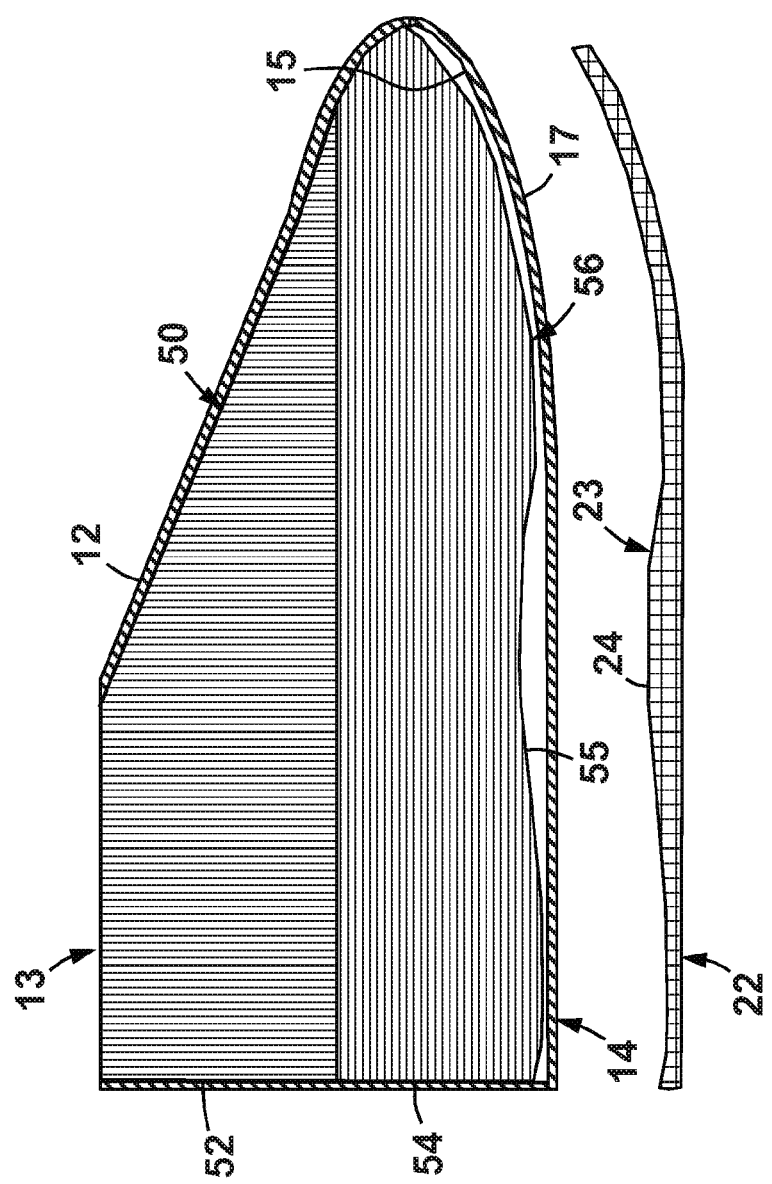
FIG. 3 is a schematic, cross-sectional view of the last of FIG. 2 along with the upper member and midsole element of the shoe of FIG. 1 according to some examples.
Figure 4:
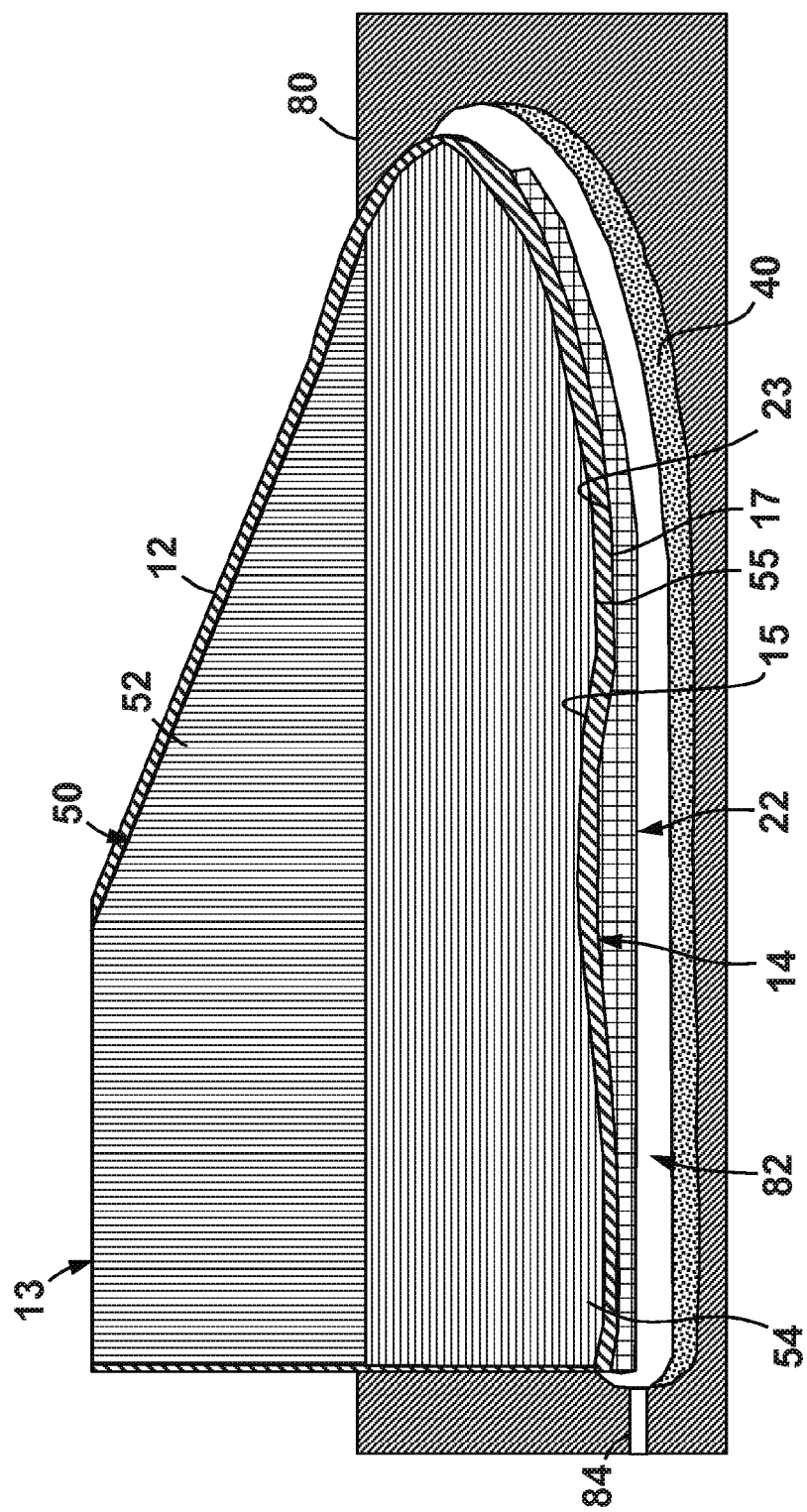
FIG. 4 is a schematic, cross-sectional view of a molding process for forming portions of the midsole on the shoe of FIG. 1 according to some examples.

Referring generally now to FIGS. 2-4, an example process or method for manufacturing shoe 10 is shown. Generally speaking, the method of FIGS. 2-4 includes placing upper member 12 (including lasting 14) about a last 50 (which is the mechanical form for the shoe 10 that generally resembles a wearer's foot) (see FIG. 2). Thereafter, the midsole 20 and outsole 40 of the shoe 10 are coupled to and/or formed about the upper member 12 and lasting 14 to complete the shoe 10. These operations will now be discussed in more detail below.

Referring first to FIG. 2, initially, the last 50 is manufactured (or produced). In particular, in this example, last 50 includes a first or upper portion 52 and a second or lower portion 54 that are engageable with one another to form last 50. Upper portion 52 of last 50 corresponds with an upper portion of a foot and lower portion 54 of last 50 corresponds with a lower portion (including the bottom) of a foot. Upper portion 52 and lower portion 54 may be engaged or coupled to one another to form last 50 through any suitable mechanism or method. In this example, upper portion 52 includes an engagement projection 53 that is received within a corresponding engagement recess or slot 51 in lower portion 54. In other examples, snaps, screws, pins, nails, hook and loop connectors, or other suitable connectors or connection mechanisms may be used to join upper and lower portions 52 and 54, respectively, of last 50.

In addition, last 50 is manufactured according to data relating to the foot of an individual user (or an idealized foot of an assumed user) (as used herein, "data relating to the foot of a user" may also be more simply referred to as "user foot data"). Specifically, in this example, lower portion 54 of last 50 is manufactured according to user foot data, and upper portion 52 is a stock or standardized portion of last 50 that does not change for each manufactured shoe (e.g., shoe 10). However, in other examples, either the upper and lower portions 52 and 54, respectively, or only upper portion 52, may be manufactured according to user foot data. In still other examples, upper portion 52 and lower portion 54 of last 50 are manufactured as one integral unit (i.e., last 50 is made of a single monolithic piece) that is manufactured according to user foot data.

In some examples, the user foot data may include one or both of three dimensional (3D) scans of the individual's foot and pressure readings associated with the foot. Specifically, 3D scans may include measurements of the foot obtained using a 3D foot scanner. Such scans may produce 3D scan data that may then be used (either alone or along with the pressure readings as described below) to create a 3D digital representation of the foot. In addition, the pressure readings (which also may be referred to herein as "pressure data") may indicate the pressure distribution experienced by the foot. The pressure readings may include both static pressure readings (e.g., when the individual is standing still) and dynamic pressure readings (e.g., when the individual is in motion), and may be used to analyze the biomechanical characteristics of the user's foot and gait such that this analysis may be included with or incorporated in the 3D digital representation of the foot. The pressure readings (e.g., static, dynamic, or both) may be obtained using a pressure sensor.

Upon creating the digital representation of the individual's foot (e.g., based on the 3D scan data and pressure readings), the digital representation may then be used to design and manufacture last 50, or lower portion 54 in this specific example, to provide the profile and/or desired performance characteristics for the individual's foot. Specifically, in this example, lower portion 54 is manufactured such that it includes a bottom surface 55 having a profile or shape 56 that corresponds with, matches, or compliments a user's foot based on the user foot data (e.g., the digital representation previously describe above).

Any suitable manufacturing technique may be used to manufacture last 50 (including upper and lower portions 52, 54). For example, in some implementations, additive manufacturing techniques may be used to manufacture last 50 (or at least the lower portion 54). In some implementations, the additive manufacturing technique may comprise a 3D printing technology, such as, for example, MultiJet Fusion (MJF), Stereolithography (SLA), Selective Laser Melting or Sintering (SLM/SLS), Fused Deposition Modeling (FDM), etc. In other examples, a subtractive manufacturing method may be used to produce last 50 (or at least the customized lower portion 54), such as, for example, milling. Last 50 (including upper portion 52 and lower portion 54) may comprise any suitable material or combination of materials to provide the desired characteristics and performance. For example, in some implementations, last 50 may comprise a polymer, a metal, an elastomer, or some combination thereof.

Referring now to FIG. 3, the upper member 12 is disposed about upper and lower portions 52 and 54, respectively, of last 50. In particular, upon completion of the shoe 10, upper member 12 forms the upper portion or region of the shoe 10 (see FIG. 1). Thus, upper member 12 may comprise fabrics, textiles, or other suitable materials depending on the design and type of shoe 10. The lasting 14 of the upper member 12 is disposed over or covers the bottom surface 55 of lower portion 54 of last 50. Lasting 14 may be integral with the other portions of upper member 12 (i.e., a single piece of fabric or textile may be used to form the upper member 12, including the lasting 14), or may be a separate component that is attached (e.g., via adhesive, sewing, etc.) to the other portions of upper member 12. Therefore, upper member 12 (including lasting 14) surrounds the entirety of last 50 except for opening 13 that eventually forms the opening into shoe 10 as previously described. Lasting 14 includes an upper surface 15 that engages with bottom surface 55 of lower portion 54 of last 50 and a lower surface 17 that is opposite upper surface 15.

Referring still to FIG. 3, once upper member 12 (including lasting 14) is disposed about the last 50 as previously described, midsole element 22 is coupled to lasting 14 of upper member 12. In this example, midsole element 22 is also manufactured (or produced) according to user foot data to provide a desired profile and/or performance characteristics specific to the user's foot (e.g., flexure, hardness, rebound, lateral and medial support characteristics, comfort, etc.). Midsole element 22 may be manufactured in substantially the same way as described above for lower portion 54 of last 50 (e.g., via 3D scan data and/or pressure data related to the foot of a user), and thus, a detailed description of this process is omitted herein in the interest of brevity. In this example, midsole element 22 includes a top or upper surface 23 that bears a profile 24 that corresponds with, matches, or compliments profile 56 on bottom surface 55 of lower portion 54 of last 50. However, it should be appreciated that in other examples, top surface 23 of midsole element 22 may not include a matching or complimentary profile with bottom surface 55 of lower portion 54 of last 50. In addition, as with last 50 (or at least lower portion 54), midsole element 22 may be manufactured through any suitable additive (e.g., 3D printing) or subtractive (e.g., milling) technique.

In this example, midsole element 22 is attached to upper member 12, and in particular to lower surface 17 of lasting 14, via any suitable technique, such as, for example, welding (e.g., with isopolybutylene), adhesive, sewing, mechanical fasteners or connectors, etc. In some examples, midsole element 22 is not fastened or secured to upper member 12 (specifically to lasting 14) prior to molding the rest of the sole 25 (which is described in more detail below). As shown in FIGS. 1 and 3, when midsole element 22 is coupled to upper member 12, lasting 14 may be disposed or captured between bottom surface 55 of lower portion 54 and upper surface 23 of midsole element 22.

Referring now to FIG. 4, the last 50, upper member 12, and midsole element 22 are inserted within a cavity 82 of a mold 80 along with outsole 40. Outsole 40 may be formed through any suitable process. In some implementations, outsole 40 is injection molded independently from last 50, upper member 12, and midsole element 22. For example, outsole 40 may be formed by injection molding within cavity 82 of mold 80. In these implementations, outsole 40 may be molded about a separate form (e.g., a last) (not shown) that is disposed within cavity 82. Outsole 40 may comprise any suitable material, such as, for example, a moldable material. In some examples, outsole 40 comprises rubber.

Regardless of the method used to form outsole 40, once the last 50, upper member 12, midsole element 22, and outsole 40 are inserted within cavity 82, a moldable material is injected into cavity 82 via a port 84 such that the moldable material fills the remaining portion or volume of cavity 82 to form the remaining portions of midsole 20. Simultaneously, during the injection molding process, the molded midsole 20 also attaches to the upper member 12, midsole element 22, and outsole 40 (see FIG. 1). Accordingly, the injection molding of midsole 20 (or the portions of midsole 20 that are not occupied by midsole element 22) works to couple the outsole 40 to the upper member 12 (e.g., via the midsole 20). Moldable material may comprise any suitable moldable material for forming a shoe midsole (e.g., an elastomer). In this example, the moldable material injected within cavity 82 may comprise polyurethane (e.g., a 2-part polyurethane).

In this example, because midsole element 22 is independently mounted to lasting 14, the moldable material may not flow or extend between midsole 20 and lasting 14. However, in other examples, the midsole element 22 is not independently secured or attached to lasting 14 as previously described and may be spaced from lasting 14 within cavity 82 such that the moldable material may flow between lasting 14 and midsole element 22, and midsole element 22 is totally enveloped or surrounded by the moldable material. In these examples, the midsole element 22 may be spaced from lasting 14 and supported by a separate spacer or support piece (not shown) within and/or integral with cavity 82 (e.g., upward projecting support members that are coupled to or integral with outsole 40). In still other examples, midsole element 22 may be partially attached to lasting 14, and may allow moldable material forming the remaining portions of midsole 20 to flow between midsole element 22 and lasting 14 during the injection molding process described above.

As the moldable material is injected within cavity 82 to form the remaining portions (e.g., other than midsole element 22) of midsole 20, the pressure exerted on lasting 14 within cavity 82 via the moldable material (e.g., either directly or via midsole element 22) forces upper surface 15 of lasting 14 into bottom surface 55 of lower portion 54 of last 50. Thus, lasting 14 (and particularly upper surface 15) is caused or forced to conform to the profile 56 of bottom surface 55. In addition, in some examples (e.g., where midsole element 22 is directly attached or not spaced from lower surface 17 of lasting 14 such as in FIGS. 3 and 4), the pressure within cavity 82 while molding the other components of midsole 20 (i.e., other than midsole element 22) may also force upper surface 23 of midsole element 22 into lower surface 17 of lasting 14. In some of these examples, the upper surface 23 of midsole element 22 may have a complimentary, corresponding, or matching profile 24 (see FIG. 3) to that of bottom surface 55 as previously described, and thus, as upper surface 23 of midsole element 22 is forced into bottom surface 17 of lasting 14, the corresponding (or complimentary or matching) nature of profile 24 with profile 56 further causes or forces lasting 14 into a desired and conforming shape or profile (e.g., a shape or profile that corresponds, matches, or compliments the shape or profile of a user's foot).

In other implementations, midsole 20 is molded onto midsole element 22, and upper member 22 as described above, but the outsole 40 is not disposed within the cavity 82. In these implementations, outsole 40 is attached (e.g., glued, molded, welded, sewn, etc.) to the midsole 20 following the molding thereof. In still other implementations, midsole 20 and outsole 40 may be formed as a single integral component that is constructed from the same material(s), and is simultaneously molded to upper member 12 and midsole element 22.

Referring again to FIGS. 1-4, upon forming the sole 25 (including midsole 20 and outsole 40) onto upper member 12 and midsole element 22 as previously described, the last 50 is removed from the upper member 12 via the upper opening 13, thereby resulting in the shoe 10 of FIG. 1. Thereafter, additional manufacturing steps may be taken to further finalize the shoe 10 for use (e.g., installing laces, adding additional covering textiles for decoration and style, inserting additional padded inserts within the upper member 12, etc.).

Upon the removal of last 50 from upper member 12, the upper surface 15 of lasting 14 may maintain the same general profile as bottom surface 55 (e.g., profile 56). Therefore, by providing a customized lower portion 54 of last 50 that engages with upper surface 15 of lasting 14 and a customized midsole element 22 that engages with lower surface 17 of lasting 14 while molding the other portions of midsole 20, the lasting 14 may include a profile or shape within the completed shoe 10 that is based on or is designed according to the user foot data. In particular, the upper surface 15 of lasting 14 may include a profile that corresponds with, matches, or compliments the foot of a user in substantially the same manner as profile 56 on lower portion 54 of last 50.

While the example of FIGS. 1-4 have shown a shoe 10 that includes a customized midsole element 22 that forms only a portion of the midsole 20, it should be appreciated that in other examples, the midsole element 22 may comprise the entire midsole (e.g., midsole 20). For example, referring now to FIGS. 5 and 6, a shoe 100 that is manufactured according to examples disclosed herein is shown. In this example, shoe 100 includes upper member 12, a midsole element 120 and outsole 40, wherein upper member 12 and outsole 40 are substantially the same as that described above for the example of FIGS. 1-4. Midsole element 120 and outsole 40 together may form the sole 125 of shoe 100.

Midsole element 120 comprises an entire midsole of shoe 100 and is manufactured according to user foot data in substantially the same manner as described above for midsole element 22 of shoe 10. In addition, midsole element 120 element may be manufactured via any suitable additive (e.g., 3D printing) or subtractive (e.g., milling) process as described above for midsole element 22. As a result, a detailed description of the manufacturing process for midsole element 120 is not included herein in the interest of brevity. In this example, midsole element 120 includes an upper surface 123 that bears a profile 124 that corresponds with, matches, complies to profile 56 on lower portion 54 of last 50 (see FIG. 7). However, as with midsole element 22 of shoe 10, it should be appreciated that midsole element 120 may not include corresponding, matching, or complimentary profile 124 on upper surface 123 in other examples.

Figure 5:
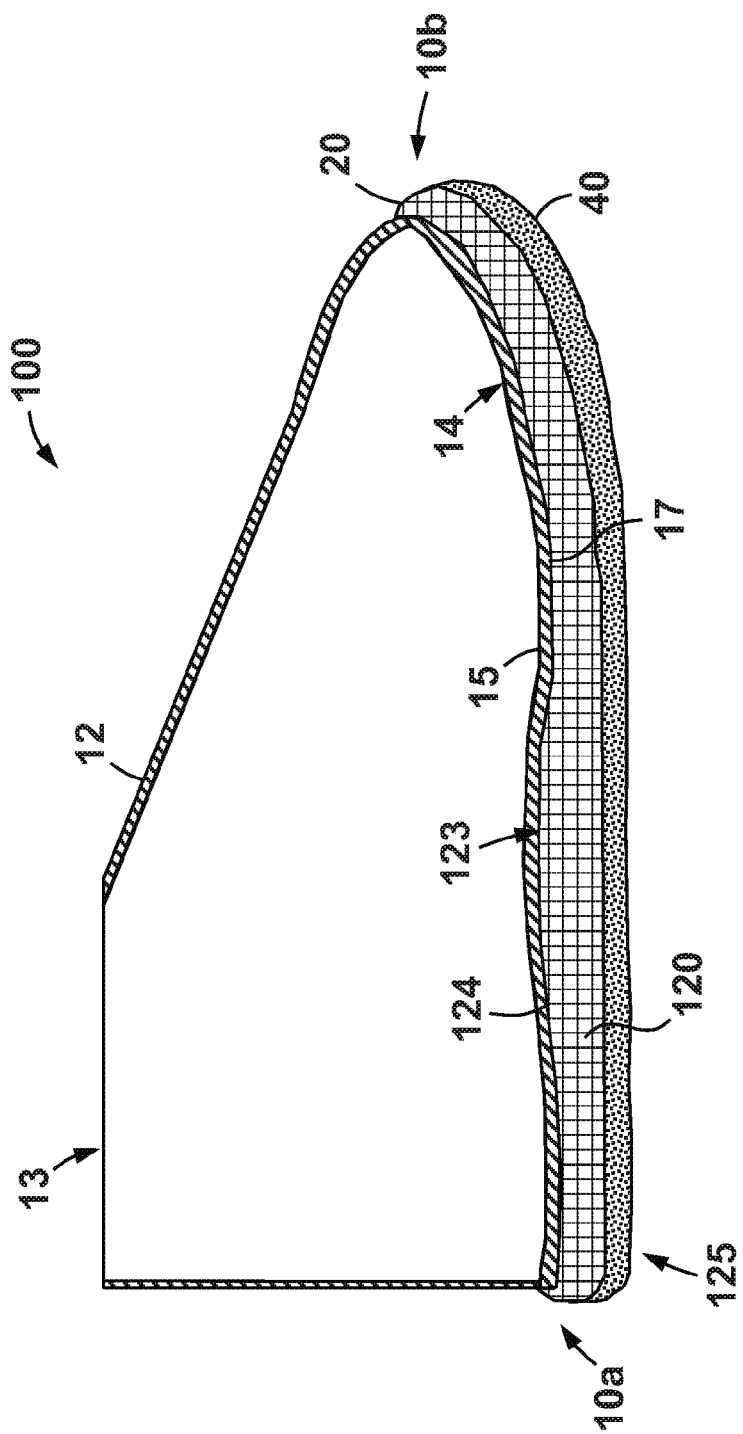
FIGS. 5 and 6 are schematic, cross-sectional views of another shoe made according to some examples.
Figure 6:
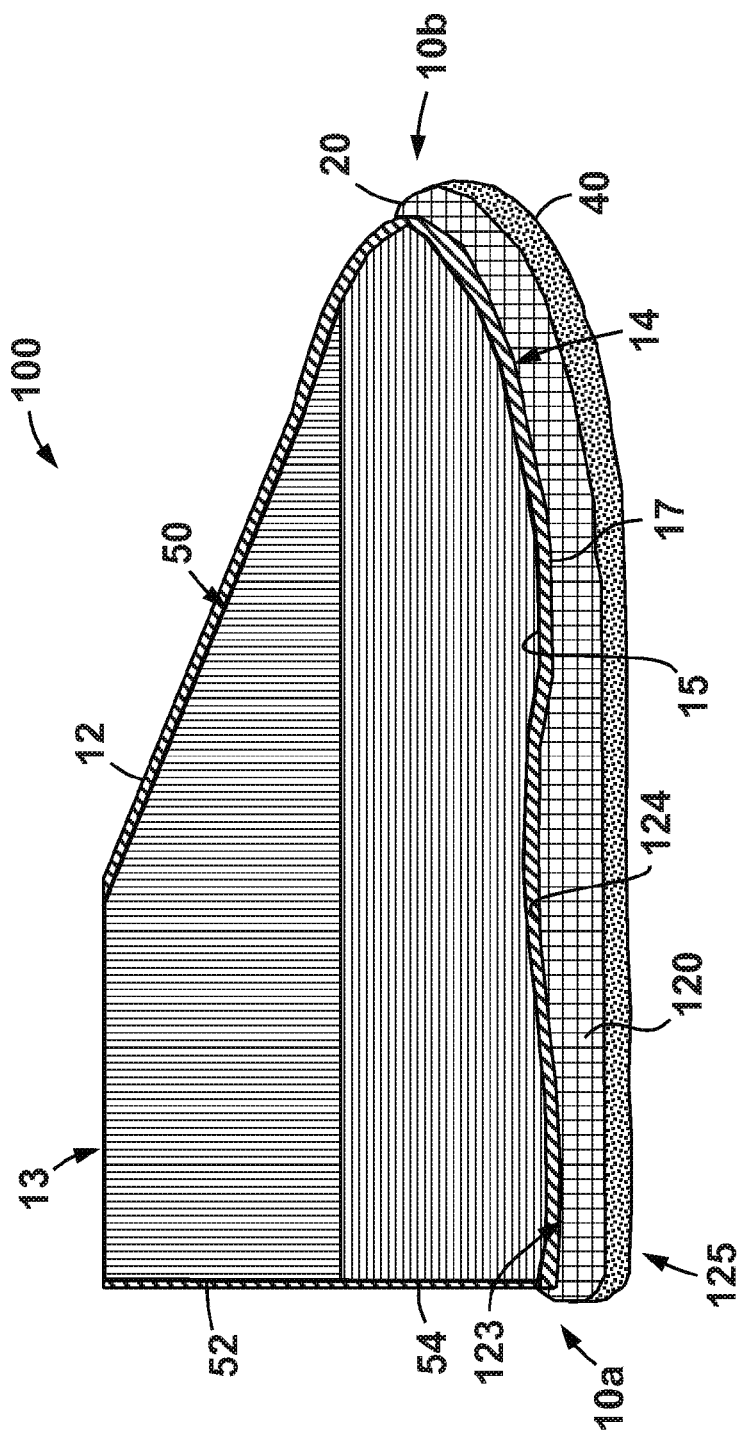

As shown in FIG. 6, once midsole element 120 is manufactured or produced (e.g., via 3D printing as described above), the midsole element 120 may be attached to lasting 14 of upper member 12 which is further disposed about last 50. In some examples, midsole element 120 may be attached to upper member 12 (e.g., lasting 14) via an adhesive, welding, sewing, mechanical attachment members (e.g., screws, pins, nails, rivets, straps, etc.) or some combination thereof. Upon attaching midsole element 120 to upper member 12, the lasting 14 is caught or captured between the bottom surface 55 of lower portion 54 of last 50 and an upper surface 123 of midsole element 120 so that lasting 14 is caused to conform with profile 56 on the bottom surface 55 as previously described. The compressive forces resulting from the attachment of midsole element 120 to upper member 12 may further facilitate the engagement between upper surface 15 of lasting 14 and bottom surface 55 of lower portion 54. In addition, in some examples, the profile 124 on upper surface 123 of midsole element 120 (i.e., for examples of midsole element 120 that include profile 124) may further force lasting 14 into a desired shape or profile based on user foot data as previously described above (e.g., a shape or profile that matches, corresponds with, or compliments the shape or profile of a user's foot). Thereafter, outsole 40 may be molded onto midsole element 120 and upper member 12 (e.g., via a mold similar to mold 90 in FIG. 4). Alternatively, outsole 40 may be separately formed (e.g., molded) and then attached (e.g., welded, glued, sewn, etc.) to upper member 12 and midsole element 120. Regardless of how outsole 40 is formed and/or coupled to upper member 12 and midsole element 120, upon removal of last 50 from upper member 12 (see FIG. 5) lasting 14 (e.g., at least upper surface 15) of shoe 100 may maintain a desired shape or profile based on user foot data as previously described such that the same benefits and performance characteristics may be achieved as previously described above for shoe 10 (see FIG. 1).

Figure 7:
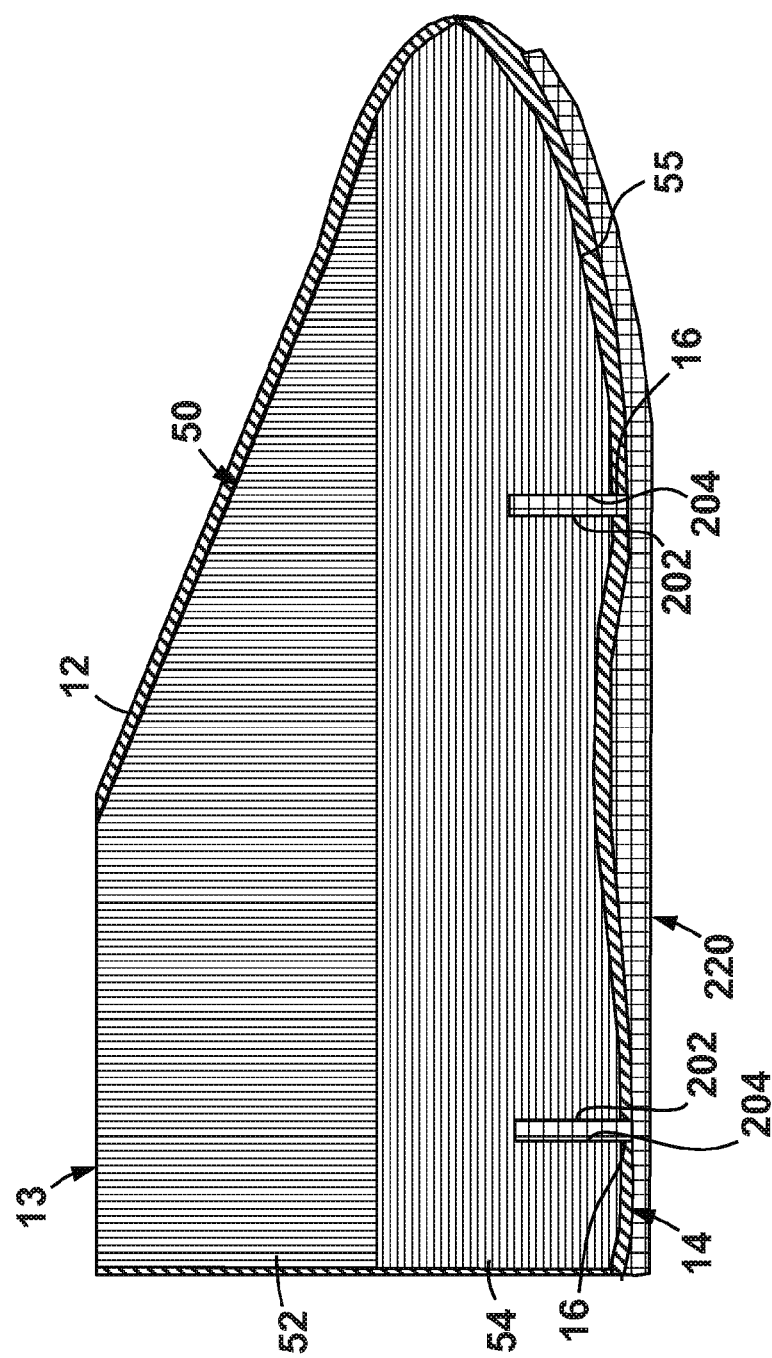
FIG. 7 is a schematic, cross-sectional view of a last, upper member, and midsole element of another shoe made according to some examples.

Referring now to FIG. 7, in some examples, the last 50 (e.g., lower portion 54) and midsole element may further include corresponding alignment members that engage to ensure that the midsole element is properly and accurately positioned relative to last 50 (e.g., lower portion 54) before and after the attachment of the other components of the sole (e.g., sole 25 and 125 shown in FIGS. 1 and 5, respectively). For example, FIG. 7 shows a plurality of male mounting projections 202 extending from a midsole element 220. Apart from projections 202, midsole element 220 is substantially the same as midsole element 22 previously described (and thus a detailed description of the other components of midsole element 220 is omitted herein in the interest of brevity). In addition, in this example, lower portion 54 of last 50 includes a pair of female mating recesses 204 that extend inward thereto from bottom surface 55.

During manufacturing operations, the upper member 12 is disposed about last 50 in the same manner as previously described above for shoe 10 (see FIG. 3). Thereafter, the midsole element 220 is attached to lasting 14 in the same manner described above for midsole element 22, except that as midsole element 220 is maneuvered or positioned relative to last 50 and upper member 12, the mounting projections 202 on midsole element 220 are inserted within the mating recesses 204 to ensure that midsole element 220 is properly positioned relative to last 50. To facilitate the insertion of projections 202 within recesses 204, lasting 14 may include apertures 16 that are aligned with recesses 204 such that projections 202 may be inserted through the apertures 16 in lasting 14, prior to entering recesses 204.

Following the attachment of midsole element 220 to upper member 12 about last 50, the remaining portions of the midsole (e.g., see midsole 20 in FIG. 1) may be formed and attached to the upper member 12, midsole element 220, and the outsole (e.g., outsole 40 in FIG. 1) in substantially the same manner as described above (see FIG. 4). However, during the attachment of the remaining portions of the midsole to the midsole element 220, upper member 12, and outsole, relative movement between last 50 and midsole element 220 (e.g., such as might be caused by the expansion of the moldable material forming the midsole) is prevented by the engagement of the projections 202 within recesses 204. As a result, a relatively high positioning precision of upper member 12 (including lasting 14) and midsole element 220 may be achieved during manufacturing operations.

Following the molding operations for the sole, last 50 is removed from upper member 12 via upper opening 13 as previously described above. During this process, the mounting projections 202 are to break away from midsole element 220 and remain within mating recesses 204 of last 50 so that the remaining portions of midsole element 220 remain as a final component of the shoe (e.g., shoe 10). To further facilitate the removal of mounting projections 202 from midsole element 220, mounting projections 202 may include a smaller diameter portion at or near the junction with the other portions of midsole element 220, and/or may be manufactured from a relatively brittle material. However, other methods of facilitating the breaking of mounting projections 202 from midsole element 220 are also contemplated herein. It should be appreciated that midsole element 120 of FIGS. 5 and 6 may also include similar mounting projections 202 for interaction with corresponding mating recesses 204 in last 50 as shown in FIG. 7.

Referring now to FIG. 8, a computing device 300 that is to determine the design of a last and a midsole element for a shoe (e.g., last 50, midsole element 22, midsole element 120, midsole element 220, etc.) is shown. Computing device 300 includes a processor 302 and a computer-readable storage medium 304.

Processor 302 may include a central processing unit (CPU), a semiconductor-based microprocessor, and/or other hardware devices suitable to control operations of computing device 300. Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. As described in detail below, computer-readable storage medium 304 may be encoded with a series of processor executable instructions 306, 308, and 312.

Specifically, data receiving instructions 306 may receive 3D scan data, such as 3D scan data of an individual's foot 305 obtained with a 3D scanner 310. In addition, data receiving instructions 306 may receive pressure readings, such as dynamic and/or static pressure readings of related individual's foot 305 with a pressure pad 320. Last design determination instructions 308 may determine a shape, structure (e.g., lattice structure), thickness, density, materials, etc., of a last (or a portion thereof) (e.g., last 50 including upper and lower portions 52 and 54, respectively) based on the 3D scan data and/or the pressure data received using data receiving instructions 306. In addition, midsole element design determination instructions 312 may determine a shape, structure (e.g., lattice structure), thickness, density, materials, etc., of a midsole element (e.g., midsole element 22, 120, 220, etc.) based on the 3D scan data and/or the pressure data received using data receiving instructions 306.

In some examples, the design of the last (e.g., a lower portion of a last) and the midsole element, from the instructions 308, 312, respectively, may include instructions for forming engagement and alignment features (e.g., mounting projections 202 in FIG. 7) on the midsole element and for corresponding alignment features (e.g., mating recesses 204 in FIG. 7) on the last (e.g., last 50). In addition, in some examples, the last design determination instructions 308 and the midsole element design determination instructions 312 may be in a form to be utilized by a 3D printer (or other additive manufacturing device) to produce a last and midsole element, respectively, according to the designs that are attachable to opposing sides of a lasting of an upper member of a shoe in the manner previously described above (e.g., upper and lower surfaces 15, 17, respectively, of lasting 14 of upper member 12—see FIGS. 1 and 5). In some of these examples, the last design determination instructions 308 and/or the midsole element design determination instructions 312 may include specific instructions for forming a lattice structure within the last and/or midsole element, respectively, (e.g., via an additive manufacturing process such as 3D printing) to affect the desired performance characteristics of the last and/or midsole element, respectively, upon its inclusion and use within a shoe.

Referring now to FIG. 9, an example method 400 of manufacturing a shoe is shown. In describing the features of method 400, reference is made to the examples of FIGS. 1-8; however, it should be appreciated that other examples may be used to perform method 400. Thus, the reference to the examples of FIGS. 1-8 should not be interpreted as limiting the application of method 400 in other implementations.

Initially, method 400 includes producing a lower portion of a last (e.g., lower portion 54 of last 50) based on data relating to the foot of a user (i.e., user foot data) at 402. For example, as previously described above in reference to FIG. 2, in some implementations, only a lower portion (e.g., lower portion 54) is produced based on data relating to a foot of a user (e.g., foot 305 in FIG. 8) that is then attached or otherwise coupled to an upper portion of the last (e.g., upper portion 52). In other implementations, an entire last is produced based on data relating to the foot of the user. The data relating to the foot of the user may include, for example, 3D scan data and/or pressure data (e.g., see scanner 310 and pressure pad 320 in FIG. 8). The lower portion of the last (either alone or along with the rest of the last) may be produced by an additive manufacturing device (e.g., a 3D printer) based on computer readable instructions (e.g., instructions 306, 308) that are derived from data relating to the foot as previously described above in the example of FIG. 8.

Next, method 400 includes placing an upper member (e.g., upper member 12) about the last (e.g., last 50) at 404. Further, method 400 includes producing a midsole element (e.g., midsole element 22, 120, 220 in FIGS. 1, 5, 7, respectively) based on data relating to a foot of a user at 406. For example, as previously described above in reference to FIGS. 2-7, a midsole element (e.g., midsole element 22, 120, 220, etc.) or at least a portion thereof is produced based on data relating to a foot of a user (e.g., foot 305 in FIG. 8), such as, for example, 3D scan data and/or pressure data (e.g., see scanner 310 and pressure pad 320 in FIG. 8). The midsole element produced at 406 may be produced by an additive manufacturing device (e.g., a 3D printer) based on computer readable instructions (e.g., instructions 306, 312 in FIG. 8) that are derived from the data relating to the foot as previously described above in the example of FIG. 8.

Next, method 400 includes attaching the midsole element to a lasting (e.g., lasting 14) of the upper member at 408, such as, for example, by sewing, welding, adhesive(s), molding a moldable material about the midsole element and the lasting (e.g., such as shown in FIG. 4) or combinations thereof as described above for the examples of FIGS. 2-7. In some examples, the midsole element is attached to the lasting of the upper member at 408 such that the lasting is disposed between the lower portion of the last and the midsole element (e.g., see FIGS. 3, 6, 7). In other examples, method 400 may also include producing and attaching remaining components of a sole to the upper member and the midsole element after attaching the midsole element to the upper member at 408. In particular, in some examples, method 400 may additionally include molding a moldable material about or to the midsole element. In still other examples, method 400 may also include removing the last from the upper member (e.g., such as via opening 13 in upper member 12 as previously described—see e.g., FIG. 1).

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A method of manufacturing a shoe, the method comprising:
    producing a lower portion of a last based on data relating to a foot of a user;
    placing an upper member about the last, wherein the upper member includes a lasting extending over the lower portion of the last;
    producing a midsole element based on the data relating to the foot of the user;
    attaching the midsole element to the upper member such that the lasting is disposed between the lower portion of the last and the midsole element;
    engaging corresponding alignment members on the lower portion of the last and the midsole element while attaching the midsole element to the upper member;
    removing the last from the upper member after attaching the midsole element to the upper member; and
    fracturing the alignment members from the midsole element while removing the last from the upper member.

2. The method of claim 1, wherein producing the midsole element comprises producing the midsole element based on either or both of:
    a three dimensional (3D) scan of the foot; and
    a pressure readings associated with the foot.

3. The method of claim 1, wherein producing the last comprises:
    producing the lower portion of the last with a three dimensional (3D) printing process; and
    attaching the lower portion of the last to an upper portion of the last.

4. The method of claim 3, wherein producing the midsole element comprises producing the midsole element with the 3D printing process.

5. The method of claim 1, further comprising:
    molding an moldable material to the midsole element; and
    removing the last from the upper member after the molding.

6. The method of claim 1, wherein attaching the midsole element to the upper member comprises attaching the midsole element to the upper member with an adhesive.

7. The method of claim 1, wherein producing the last comprises producing the lower portion of the last based on either or both of:
   a three dimensional (3D) scan of the foot; and
   pressure associated with the foot.

8. The method of claim 5, wherein the moldable material comprises an elastomer.

* * * * *